US006693273B1

United States Patent
O'Connor et al.

(10) Patent No.: US 6,693,273 B1
(45) Date of Patent: Feb. 17, 2004

(54) METHOD AND APPARATUS FOR MONITORING A POWERED VENT OPENING WITH A MULTIFACETED SENSOR SYSTEM

(75) Inventors: Christopher J. O'Connor, Northville, MI (US); Stephen A. Hawley, Bedford, MA (US)

(73) Assignee: Prospects, Corp., Novi, MI (US)

( * ) Notice: Subject to any disclaimer, the term of this patent is extended or adjusted under 35 U.S.C. 154(b) by 0 days.

(21) Appl. No.: 09/563,486

(22) Filed: May 2, 2000

(51) Int. Cl.$^7$ .................................................. H01J 40/14
(52) U.S. Cl. ............................ 250/221; 49/25; 340/555
(58) Field of Search ................................. 250/221, 206; 187/315–317, 392; 49/25, 28; 340/555–557, 552, 545.1, 545.2; 180/286, 289

(56) References Cited

U.S. PATENT DOCUMENTS

| 3,337,992 A | 8/1967 | Tolson ............................ 49/29 |
| 3,627,082 A | 12/1971 | Berkovitz ...................... 187/52 |
| 4,028,690 A | 6/1977 | Buckley et al. .......... 340/258 B |

(List continued on next page.)

FOREIGN PATENT DOCUMENTS

| DE | 2821681 | 11/1979 |
| DE | 4007271 | 9/1991 |
| DE | 4030607 | 4/1992 |
| DE | 9302676 | 5/1993 |
| DE | 4226134 | 2/1994 |
| WO | 89/08952 | 9/1989 |
| WO | 94/08120 | 4/1994 |

*Primary Examiner*—Thanh X. Luu
(74) *Attorney, Agent, or Firm*—Weingarten, Shurgin, Gagnebin & Lebovici LLP

(57) ABSTRACT

A system and method are disclosed for enabling the selective monitoring of various regions of an aperture having a powered closure operative therein. Each of plural, individually selectable emitters is adapted to provide a narrow beam whose angle with respect to a horizontal plane is offset from the other emitters. All of the radiated beams lie in substantially the same plane in azimuth. A controller responds to certain stimuli to selectively activate one or more of the emitters. The energy thus produced is monitored by a receiver preferably disposed within the same housing. The receiver output is analyzed by the controller to identify the presence of an obstacle in that portion of the aperture illuminated by the selected emitter(s). A variety of systems may provide input to the controller for the purpose of influencing which of the plural emitters are to be activated for object detection. In an alternative embodiment, one or more unswitched emitters may be used in conjunction with plural, selectively activated receivers. In a further embodiment, plural emitters and plural receivers are provided, all being independently selectable by the controller. The ability to selectively monitor a discrete portion or portions of an aperture, based upon a variety of factors, is provided.

6 Claims, 8 Drawing Sheets

U.S. PATENT DOCUMENTS

| | | | |
|---|---|---|---|
| 4,107,941 A | 8/1978 | Hamilton et al. | 62/186 |
| 4,139,801 A | 2/1979 | Linares | 315/83 |
| 4,220,900 A | 9/1980 | Mintz | 318/266 |
| 4,236,594 A | 12/1980 | Ramsperger | 180/167 |
| 4,266,124 A | 5/1981 | Weber | 250/221 |
| 4,274,226 A | 6/1981 | Evans | 49/25 |
| 4,452,009 A | 6/1984 | Baumeler et al. | 49/25 |
| 4,458,446 A | 7/1984 | Mochida et al. | 49/28 |
| 4,481,450 A | 11/1984 | Watanabe et al. | 318/444 |
| 4,621,452 A | 11/1986 | Deeg | 49/28 |
| 4,733,081 A | 3/1988 | Mizukami | 250/341 |
| 4,736,097 A | 4/1988 | Philipp | 250/221 |
| 4,742,337 A * | 5/1988 | Haag | 340/556 |
| 4,766,421 A | 8/1988 | Beggs et al. | 340/904 |
| 4,818,866 A | 4/1989 | Weber | 250/221 |
| 4,823,010 A | 4/1989 | Kornbrekke et al. | 250/341 |
| 4,866,881 A | 9/1989 | Morrow et al. | 49/25 |
| 4,870,333 A | 9/1989 | Itah et al. | 318/286 |
| 4,894,952 A | 1/1990 | Trett et al. | 49/25 |
| 4,912,748 A | 3/1990 | Horii et al. | 250/221 |
| 4,924,166 A | 5/1990 | Roussel | 318/608 |
| 4,926,170 A | 5/1990 | Beggs et al. | 340/904 |
| 4,942,385 A | 7/1990 | Kobayashi et al. | 340/556 |
| 4,943,757 A | 7/1990 | Richter et al. | 318/468 |
| 4,967,083 A | 10/1990 | Kornbrekke et al. | 250/341 |
| 4,973,837 A | 11/1990 | Bradbeer | 250/221 |
| 4,990,783 A | 2/1991 | Muller et al. | 250/353 |
| RE33,668 E | 8/1991 | Gray | 250/221 |
| 5,053,592 A | 10/1991 | Zuercher | 200/553 |
| 5,054,686 A | 10/1991 | Chuang | 236/49.3 |
| 5,059,877 A | 10/1991 | Teder | 318/444 |
| 5,069,000 A | 12/1991 | Zuckerman | 49/28 |
| 5,074,073 A | 12/1991 | Zwebner | 49/26 |
| 5,081,586 A | 1/1992 | Barthel et al. | 364/424.05 |
| 5,122,796 A | 6/1992 | Beggs et al. | 340/904 |
| 5,134,292 A | 7/1992 | Segawa et al. | 250/342 |
| 5,142,152 A | 8/1992 | Boiucaner | 250/341 |
| 5,149,921 A | 9/1992 | Picado | 187/130 |
| 5,191,268 A | 3/1993 | Duhame | 318/266 |
| 5,210,406 A | 5/1993 | Beran et al. | 250/221 |
| 5,245,177 A | 9/1993 | Schiller | 250/221 |
| 5,326,967 A | 7/1994 | Herrmann et al. | 250/221 |
| 5,334,876 A | 8/1994 | Washeleski et al. | 307/10 |
| 5,335,186 A | 8/1994 | Tarrant | 364/550 |
| 5,399,950 A | 3/1995 | Lu et al. | 318/565 |
| 5,418,359 A | 5/1995 | Juds et al. | 250/221 |
| 5,424,711 A | 6/1995 | Muller et al. | 340/426 |
| 5,506,567 A | 4/1996 | Bichlmaier et al. | 340/555 |
| 5,539,290 A | 7/1996 | Lu et al. | 318/565 |
| 5,955,854 A | 9/1999 | Zhang et al. | 318/480 |
| 6,324,453 B1 * | 11/2001 | Breed et al. | 701/45 |
| 6,431,592 B2 * | 8/2002 | Seip | 280/735 |

* cited by examiner

APERTURE CARD

APERTURE CARD

METHOD AND APPARATUS FOR MONITORING A POWERED VENT OPENING WITH A MULTIFACETED SENSOR SYSTEM

CROSS REFERENCE TO RELATED APPLICATIONS

N/A

STATEMENT REGARDING FEDERALLY SPONSORED RESEARCH OR DEVELOPMENT

N/A

BACKGROUND OF THE INVENTION

With the advent of automated closure systems have come new benefits as well as new risks. For instance, in vehicle applications, power windows equipped with "express close" capability enable an operator to close a window with a brief activation of a window control switch. This enables a driver to return both hands to the steering wheel quickly. Express close capability has also found use in enabling convenience features such as automatic venting of a vehicle and automatic window closure upon detection of rain, motion, or a command from a remote signaling device such as a key fob.

However, the possibility exists that an obstacle may be present in the path of a window which has been commanded to express close. Absent failsafe features, such an obstacle may be struck by the closing window and pinned against the surrounding trim. Sufficient force may be applied by such a window to entrap children, pets or fragile, oversized articles extending from the window aperture.

Contact-based systems were initially developed to detect the presence of an obstacle in the path of an express closing window. Such contact-based systems include window motor-monitoring systems. which may monitor the frequency of window motor operation over a given period of time by tracking characteristics present in the motor drive current. Alternatively, the number of revolutions of the window motor may be correlated into a description of the window travel distance. If it is determined that the window has not traveled far enough over a given time period, an obstacle may have been detected. Other contact-based systems have been employed, including various resistive systems which monitor the electrical characteristics of a circuit disposed either along the edge of a closure such as a window, or along the fixed surface against which the closure contacts when fully closed. The obvious detriment in such systems is the necessity that contact and entrapment with an obstacle must occur for there to be obstacle detection.

As an alternative, non-contact obstacle detection systems have been proposed. Such systems typically generate an energy curtain across all or a substantial portion of the aperture in which the closure travels, and a receiver monitors the state of this energy curtain. When an obstacle enters the aperture, a disruption in the energy curtain is observed by the receiver and the automatic closing of the window may be inhibited.

A variety of detection systems have been proposed, such as those employing infrared or ultrasound emitters and receivers. Plural emitters and receivers have been proposed, either co-located in a single housing or distributed about an aperture. However, they have typically been utilized to monitor most if not all of the aperture, with no selectivity, regardless of whether one or more portions of the aperture may be more or less important in terms of obstacle detection and overall system performance.

Consequently, it would be desirable to have a non-contact based obstacle detection system which would provide the flexibility to monitor one or more selected regions of an aperture, depending upon the conditions associated with the aperture.

BRIEF SUMMARY OF THE INVENTION

A system and method are disclosed for enabling the selective monitoring of various regions of an aperture having a powered closure operative therein. In one embodiment, plural emitters are disposed within a common housing. Each emitter is adapted to provide a relatively narrow beam whose angle with respect to a horizontal plane is offset from the other emitters. Preferably, the radiated energy from all emitters covers substantially all of the aperture due to a certain degree of overlap between consecutive radiated fields. All of the radiated fields lie in substantially the same plane in azimuth. Thus, the detector system is capable of providing an energy field proximate any portion of the target aperture.

Associated with this embodiment of the invention is a controller which is capable of responding to certain stimuli and in response to selectively activate one or more of the co-located emitters. The energy curtain thus produced is monitored by a receiver which is preferably disposed within the same housing. The receiver output is then provided to the controller, which is capable of determining whether the receiver output is indicative of the presence of an obstacle in that portion of the aperture which was illuminated by the selected emitter or emitters.

A variety of systems may provide input to the controller for the purpose of influencing which of the plural emitters are to be activated for obstacle detection. Exemplary inputs to the controller include: vehicle ignition status; express close activation indication; window position information; vehicle climate control system data; inputs from rain, temperature, light, or motion sensors; and vehicle alarm system status. Thus, if a vehicle is running, an operator has commanded a window closed via an express close function, and the window is two-thirds of the way up already, the only important portion of the aperture from an obstacle detection standpoint is the remaining one-third of the open aperture. The controller may utilize the inputs as above to activate only those emitters which provide a radiation field across this upper portion of the aperture. The receiver is then operative to monitor the reflected energy and provide an output to the controller for obstacle detection.

A further example involves an indication to the controller that the vehicle is off, that the vehicle alarm system is active, and that the windows have been automatically lowered as a result of an automatic hot air venting function. It is preferable to monitor only the portion of the window which is open for venting purposes in order to minimize current drain on the vehicle battery.

In an alternative embodiment, one emitter may be used to illuminate proximate the aperture, and plural receivers, each having a limited field of view, are selectively activated to monitor the desired aperture portion. Thus, assuming the vehicle is running and an operator has commanded an express close of a window which is already two-thirds raised, it would be desirable to monitor only the upper third of the open window by activating a receiver whose field of view encompasses that portion of the aperture.

In a further embodiment, plural emitters and plural receivers are provided, all being independently selectable by the controller.

Regardless of specific implementation, the fundamental aspect of the presently disclosed invention is the ability to selectively monitor a discrete portion or portions of an aperture based upon a variety of factors. Flexibility in terms of response to detected conditions is also enabled.

DETAILED DESCRIPTION OF THE INVENTION

Non-contact obstacle detection systems have been employed in conjunction with vehicle windows and other apertures having powered closures disposed for travel therein. In vehicular applications, a housing for an obstacle detection system is preferably placed in the lower front corner for the forward windows. From this location, the emitter must project an energy curtain which lies adjacent substantially all of the aperture.

Such systems have typically employed IR emitters and receivers. Yet, IR emitters are often provided as light emitting diodes (LEDs) having an angular dispersion of approximately twenty degrees (+/−10 degrees). A single LED therefore produces an energy field which is too narrow in elevation to cover the entire aperture and which is wider than required in azimuth. The latter characteristic may result in the detection of objects which in fact are not necessarily adjacent the aperture and which are not at risk of being struck by the window or of becoming trapped in the aperture.

Figure 1A:
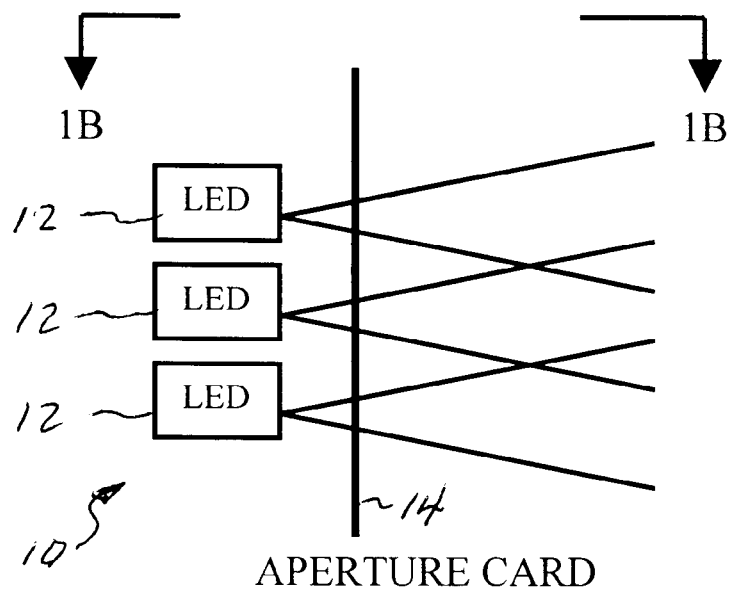
FIGS. 1A and 1B illustrate prior art arrangements of plural, co-located emitters.

One prior art resolution to this problem has been to utilize plural emitters 12 in an array 10 of emitters configured to provide a wider energy curtain in elevation. Such as arrangement is illustrated in FIG. 1A. Thus, when conditions warrant activation of this prior art obstacle detection or aperture monitoring system, all of the emitters 12 are activated at once. Some overlap in emitted radiation is necessary in order to eliminate the possibility of gaps in coverage. Optics which would normally be used to focus the emitted energy are not shown in these figures for the sake of simplicity.

Figure 1B:
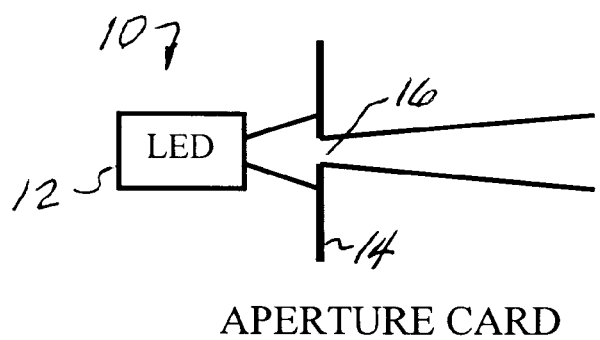

A residual problem associated with this prior art approach is illustrated in the overhead view of FIG. 1B. Because the LED emitters 12 have roughly a twenty degree dispersion pattern (FIGS. 1A and 1B not being drawn to scale), a significant degree of energy must be blocked, such as through the use of an aperture 16 formed in an aperture card 14, in order to provide an energy field which is relatively narrow in azimuth. Thus, a significant amount of power is wasted through the illumination of the aperture card 14. In vehicular applications relying on the vehicle battery for power in operating the obstacle detection system, it is important to minimize the amount of power drawn. The illustrated prior art system would therefore be undesirable for use as part of an intrusion detection system which is operative when the vehicle ignition is off.

One possible resolution to this problem involves the use of LEDs having a narrower dispersion pattern. For instance, suitable emitters available today have an angular dispersion of two and one half to five degrees. While utilization of these narrow beam LEDs conserves at least some of the power otherwise wasted in azimuth, more of them must be employed in order to provide adequate coverage in elevation. In prior art vehicle security applications, all of the these LEDs have been driven even though a region of most concern may be located within the radiated field emitted by a subset of the LEDs. Thus, excess power consumption still exists in prior art systems.

The concept of the present invention enables the selective monitoring of one or more regions of interest in a plane adjacent an aperture. In a first embodiment, this selectivity is with respect to plural LEDs 22, 32 in an array of LEDs. Preferably, the constituent LEDs 22, 32 are those with a narrower angular dispersion, such as two and a half to five degrees, compared to those described in conjunction with FIGS. 1A and 1B. With reference to FIGS. 2A, 2B, 3A, and 3B, aperture monitoring modules 20, 30, 40, 50 providing this selective activation capability are illustrated. Included in these modules are one or more emitters, one or more receivers, and a controller in electrical communication with the emitters and receivers. Preferably, the emitters are IR LEDs and the receivers are IR receivers, though devices of other wavelengths can be adapted to these purposes, as will be discussed below.

Figure 2A:
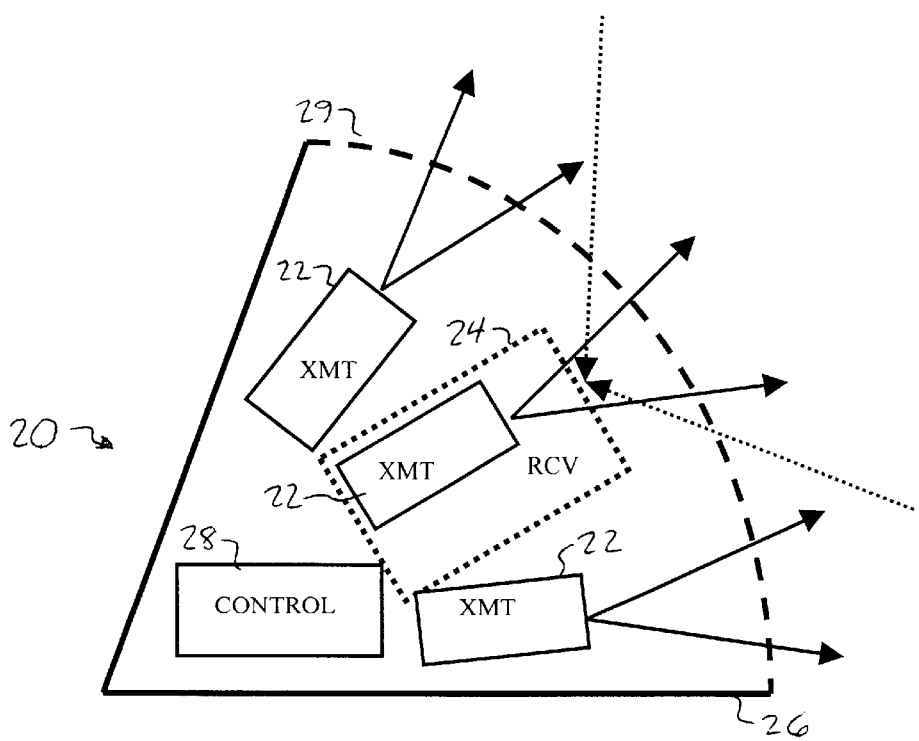
FIGS. 2A and 2B illustrate two embodiments of a multifaceted sensor system according to the presently disclosed invention in which plural emitters and a single receiver are employed.
Figure 2B:
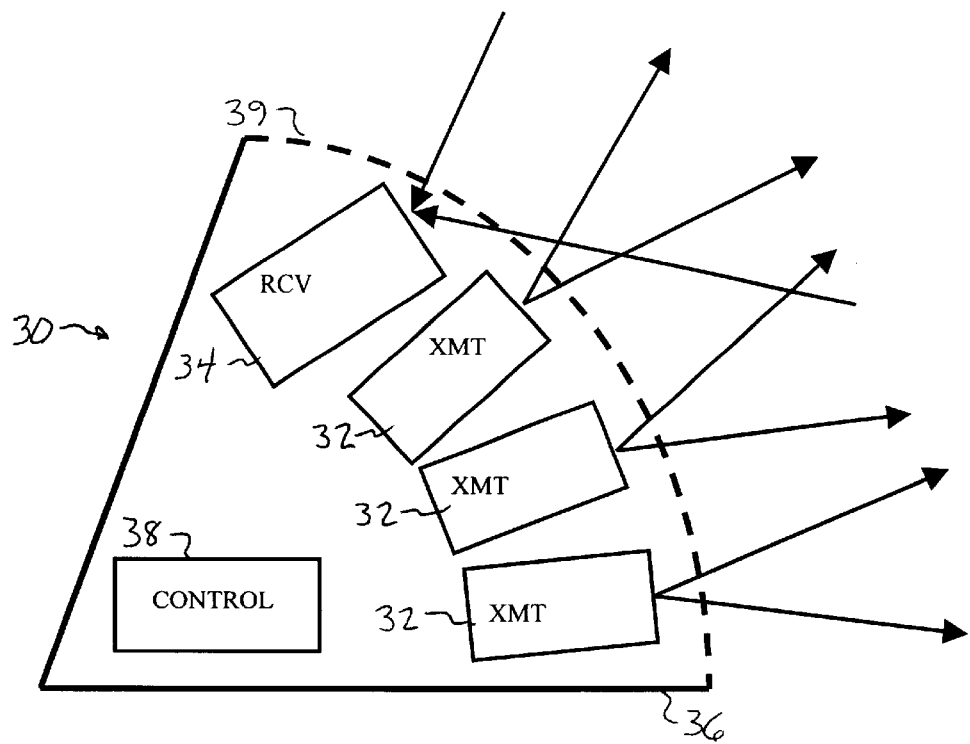
Figure 4A:
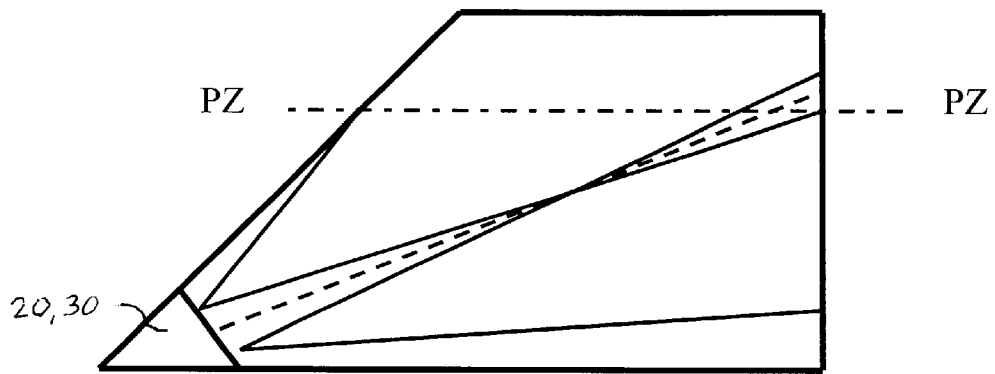
FIG. 4 illustrates a further embodiment of a multifaceted sensor system in which one emitter and plural receivers are employed.
Figure 4B:
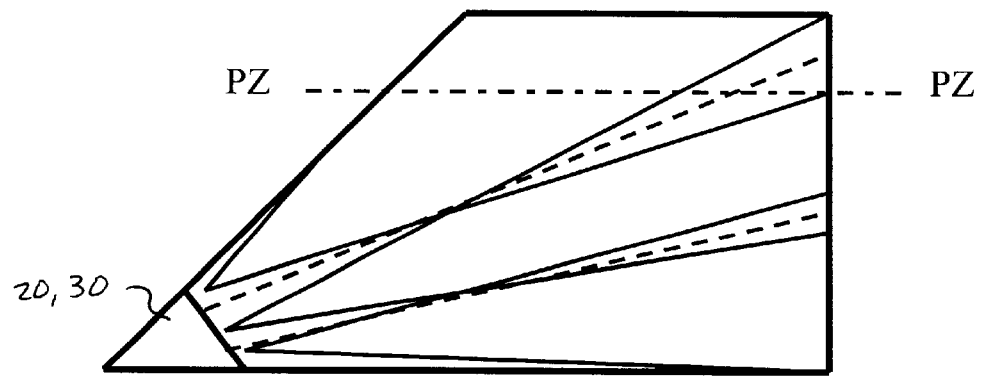

The individual emitters 22, 32 are angularly offset in elevation, as shown in FIGS. 2A and 2B, in order to provide the ability to generate the overlapping energy patterns shown in FIGS. 4A and 4B, if desired. In these embodiments, one receiver 24, 34 having a sufficiently wide field of view has been provided, though plural receivers having overlapping fields of view could also be employed in alternative embodiments. Note that three emitters 22, 32 are illustrated in FIGS. 2A and 2B. These embodiments may correspond roughly to the beam pattern of FIG. 4B. An embodiment of the systems of FIGS. 2A and 2B employing two emitters would result in the beam pattern of FIG. 4A. It is envisaged that more than two or three emitters would be used in yet further embodiments. These embodiments would provide enhanced flexibility in terms of selecting which portions of the overall energy curtain can be emitted.

In FIG. 2A, the emitters 22 are in substantially the same vertical plane, while the receiver 24 is disposed in a parallel vertical plane. Physically, the emitters 22 and the receiver or receivers 24 may be disposed on respective circuit boards (not shown), both of which are located in the same housing 26. The housing 26 may be a discrete thermoplastic unit, or can be provided as an integral portion of the vehicle trim adjacent the aperture to be monitored. The controller 28 may be located on the emitter circuit board, the receiver circuit board, or its own circuit board, the choice of which may be driven by form factor or electrical isolation considerations. A common microprocessor and associated memory, the latter being either discrete or integral with the microprocessor, are preferably employed in realizing the controller 28.

Disposed over the active ends of the emitters 22 and receiver 24 is a lens 29 which may be substantially passive in terms of beam shaping effect or which may impart some degree of focusing of the emitted and received radiation. The lens 29 is preferably fabricated from common thermoplastic material. Cylindrical lenses are fairly simple and inexpensive to fabricate and thus may find particular utility in the presently disclosed invention. The shape of the lens 29, 39 in the figures is not necessarily intended to represent the actual shape of such a cylindrical lens in an actual module 20, 30.

In the embodiment of FIG. 2B, the receiver 34 and emitters 32 are located on the same circuit board within the housing 36. The controller 38 may also be provided on this board. As mentioned, a cylindrical lens 29, 39 may be employed in this embodiment or in that of FIG. 2A for assisting in minimizing the beam dispersion in azimuth while enabling the emitters 24, 34 to project a sufficiently wide energy field in elevation.

Location of the emitter(s) and receiver(s) on the same circuit board has the advantage of enabling more accurate alignment of the elements which is particularly important as emitters with more narrow beams are employed. It also facilitates a stable physical relationship between these elements and the lens, thus resulting in a more predictable and desirable beam shape. Tight tolerances between the lens, the emitters, and the receivers maximizes system performance.

A common lens may be employed for the emitter(s) and receiver(s) as long as light is not directly coupled into the receiver(s). If necessary, a physical barrier or discrete optics may be utilized to prevent such coupling.

In either of the embodiments shown in FIGS. 2A and 2B, the receiver 24 may in fact be realized by using plural individual receiver units having overlapping fields of view. Such plural receivers are not switched in one embodiment.

Whether realized through one or plural discrete receivers 24, 34, the embodiments of FIGS. 2A and 2B provide receiver outputs, indicative of the relative power of the energy received, to the respective controller 28, 38. The controller in turn compares the receiver output signal to one or more threshold values stored in an associated memory for the purpose of determining whether an object lies within the volume adjacent the aperture as illuminated by the selected emitter(s) and monitored by the receiver(s).

Figure 3A:
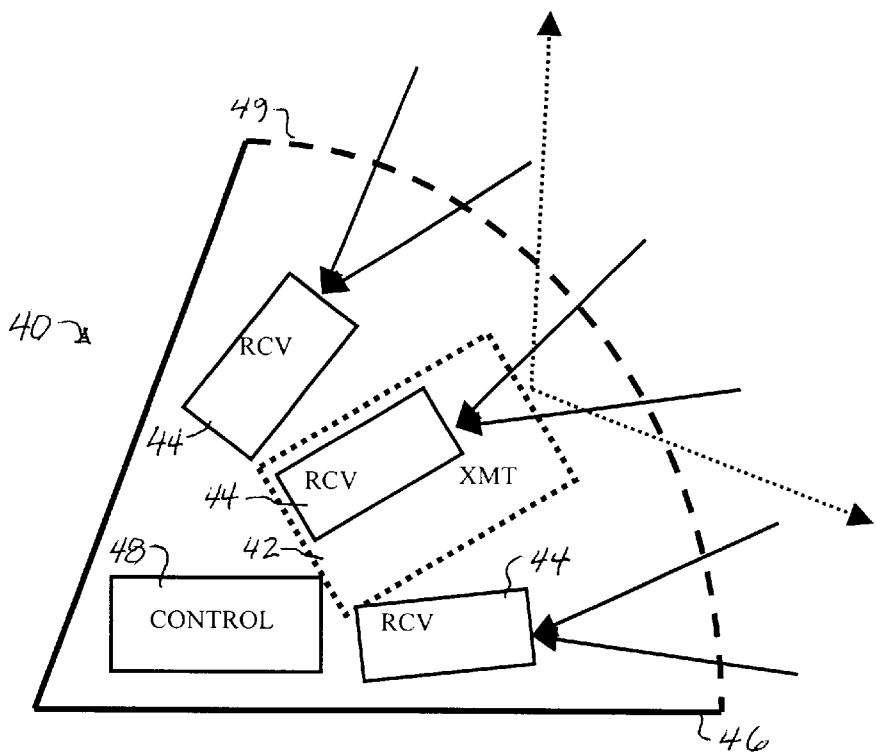
FIGS. 3A and 3B illustrate the resulting radiation beam coverage from variants of the embodiments of the multifaceted sensor system of FIGS. 2A and 2B.

In alternative embodiments of the modules 40, 50, plural, switchable receivers 44, 54 are provided within the housing 46, 56. In FIG. 3A, an emitter 42 is disposed on a separate circuit board from the receivers 44, though in FIG. 3B, the receivers and emitter are disposed in a common plane. As in FIGS. 2A and 2B, the controller 48, 58 may be disposed on the same circuit board as the emitter 42, 52 or the receivers 44, 54, or may have its own circuit board. While one LED emitter 42, 52 is shown in each of these modules, it should be understood based upon the illustrated embodiments of FIGS. 2A and 2B that plural LED emitters could also be employed, and in fact may be required, to adequately illuminate the entire aperture field. Once again, respective optics have been omitted from the illustrated embodiments for the sake of simplicity.

Figure 3B:
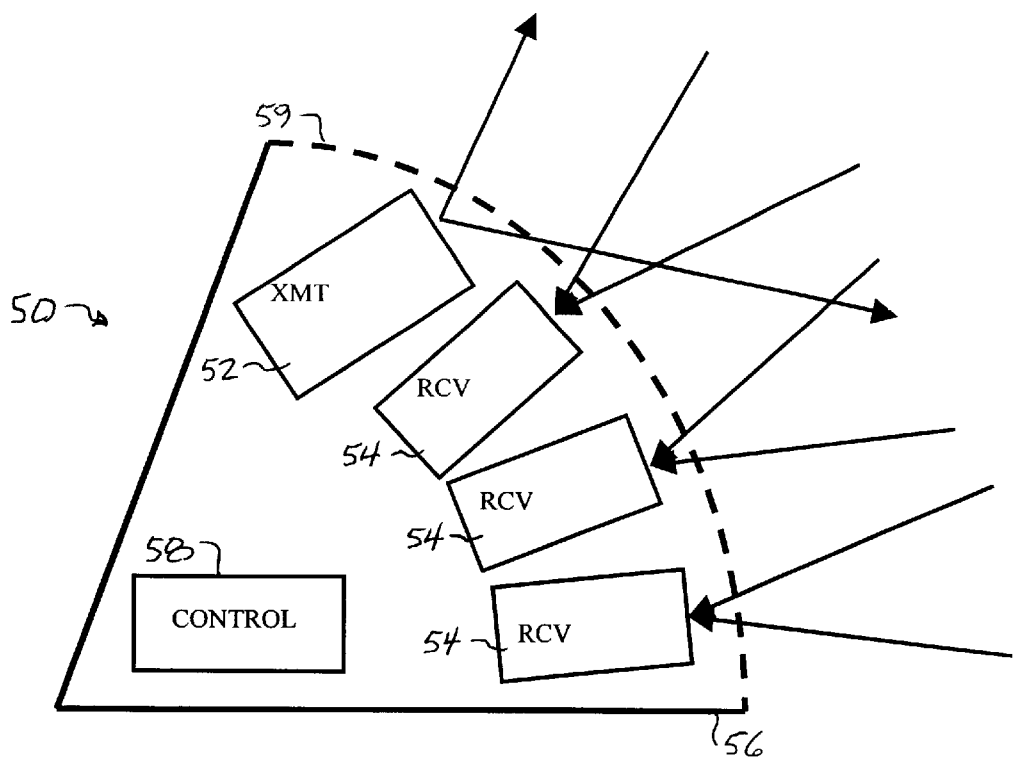

In FIGS. 3A and 3B, the selectivity in monitoring portions of a volume adjacent an aperture is implemented by allowing the controller 48, 58 to selectively activate one or more of the plural receivers 44, 54. The controller 48, 58 is then capable of comparing the resulting signals from the selected receiver(s) 44, 54 to a threshold or set of thresholds in order to determine whether an object exists within the field illuminated by the LED(s) 42, 52 and monitored by the receiver(s) 44, 54. The receiver outputs are indicative of the power of the reflected light energy.

While the embodiments of FIGS. 3A and 3B are useful in providing a monitoring system which consumes less power if only selected receivers are activated, it is the emitters which typically consume more power per unit volume monitored. Therefore, in practice, the embodiments of FIGS. 2A and 2B, in which selectivity is provided with respect to which emitters are activated, is preferred.

Figure 5:
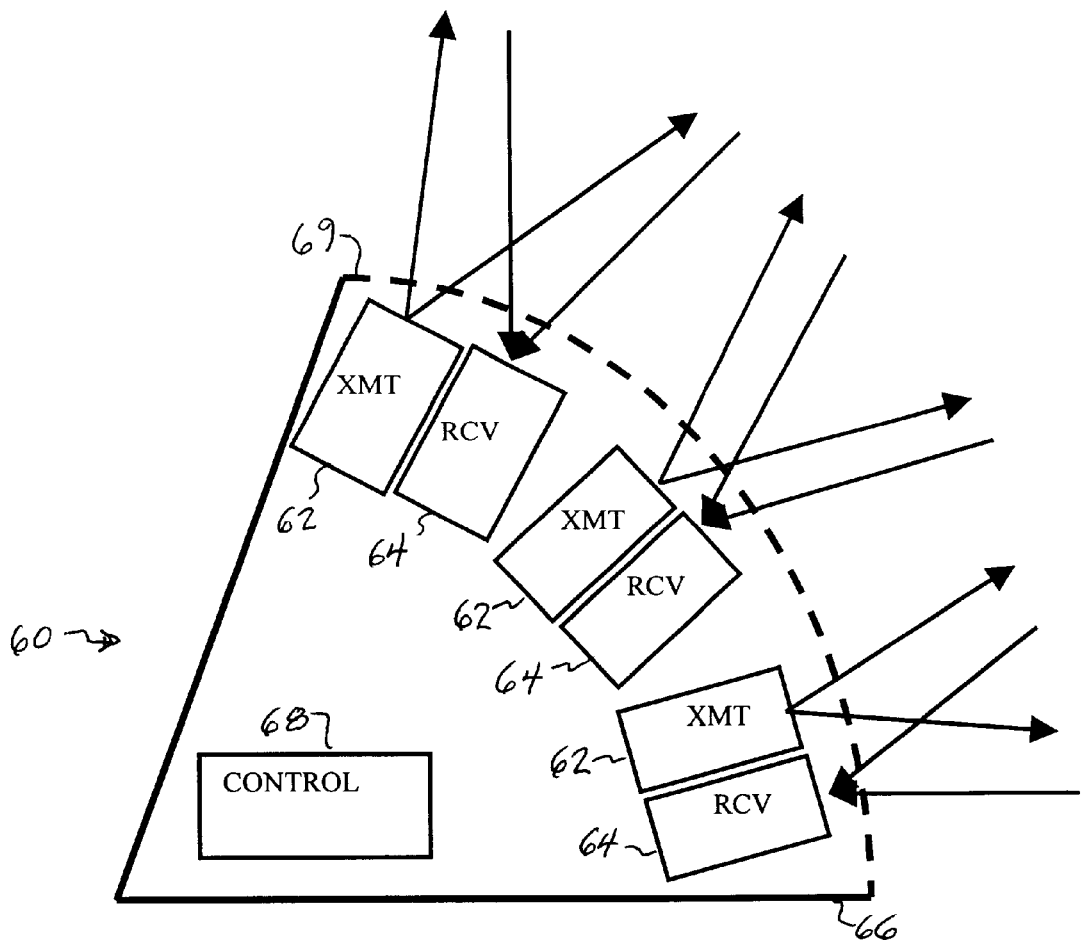
FIG. 5 illustrates a further embodiment of a multifaceted sensor system in which plural emitters and receivers are employed.

Under ideal conditions, and borrowing from the concepts illustrated in FIGS. 2A, 2B, 3A, and 3B, each module 60 would be provided with plural, switchable emitters 62 and plural, switchable receivers 64, such as shown in FIG. 5. Here, if a given volume of airspace adjacent an aperture was desired to be monitored, only that volume would be illuminated by a selected emitter(s) 62 and only that volume would be monitored by a selected receiver(s) 64. The controller 68 would then compare the selected receiver output signals to one or more thresholds stored in association with the controller 68 in establishing whether an object was detected in the selected volume.

However, in practice, this module 60 embodiment may be difficult to realize due to the difficulty in keeping the emitter 62 and receiver 64 elements aligned, particularly in vehicular applications which would subject the module 60 to a significant amount of jarring. Also, receivers tend to have a wider field of view than suitable emitters, such that an exact correlation of illuminated region and monitored region would be difficult to realize. Thus, from a power-savings and reliability standpoint, the most preferred embodiment includes plural, switchable emitters, and one or more unswitched receivers such as shown in FIGS. 2A and 2B.

If an object is detected through analysis of the output of the selected receiver(s), various responses can be initiated by the controller. For instance, some form of audible or visual annunciator may be provided for alerting an operator to the presence of the detected object. Preferably, the controller is capable of inhibiting the operation of a powered closure within the aperture in order to avoid entrapment of a detected object. If the closure is already in motion towards a closed position at the time of object detection, the closure motion may be slowed, stopped, or reversed. Other response mechanisms may be provided, as required by the application.

In a further embodiment, the aperture monitoring system 100 may further comprise elements for selectively monitoring one or more volumes outside the plane proximate the aperture as previously described. Thus, a desired portion of the aperture may be monitored by selective activation of the aperture monitoring system 100. Upon detection of a selected condition or set of conditions, the system may selectively activate emitter(s) and/or receivers which enable the monitoring of a volume outside the plane already monitored. For instance, in a vehicle security application, it may be desirable to establish whether an obstacle detected within a plane adjacent an aperture originates from within the vehicle or not. To this end, once an obstacle has been detected within the pinch zone, the aperture monitoring system may activate further emitters which selectively illuminate a volume of airspace within the interior of the vehicle. Selected receivers are also activated to receive reflected energy from within this interior volume. If it is established that the obstacle originates from within the vehicle, an alarm condition may not be established, though a closing window may be halted to prevent entrapment.

In a further alternative embodiment employing selectively actuated emitters/and or receivers which provide monitoring capabilities inside the vehicle (i.e. outside the radiation plane adjacent the aperture), the presently disclosed aperture monitoring system may be employed to selectively establish whether a vehicle occupant is "out of place" with respect to an airbag. For instance, if an occupant is found to be too close to a side air bag as a result of the selective activation of emitter(s) and receiver(s) of an aperture monitoring system, deployment of the air bag may be disabled, or the force with which the airbag deploys may be limited. In this embodiment, selective monitoring of the vehicle interior may result from an accelerometer (not illustrated) or other detector which is capable of establishing the onset of a collision. Alternatively, the monitoring of the interior airspace, apart from a plane proximate an aperture, may be performed by a suitably programmed controller on a periodic basis such that air bag deployment decisions need not be delayed pending new results from the vehicle interior monitoring.

As previously described, detection of an object by the controller typically involves the generation of an output signal indicative of the relative power of the energy sourced by the one or several emitters and reflected back to the receiver generating the output signal. The output signal under normal, unobstructed conditions is normalized and one or more thresholds are determined relative to this known condition. For instance, two conditions may be identified, "no object present" and "object present." To realize these conditions, one threshold value must be defined for comparison against the receiver output. In another example, three conditions may be defined, "no object present," "indeterminate," and "object present." In this case, plural threshold values, stored in a memory element associated with the controller, would be utilized for comparison against the receiver output.

In the case where plural receivers are utilized for monitoring a desired volume of space adjacent an aperture, some mechanism must be provided for factoring in the contributions from each receiver. One such mechanism is additive, whereby the output signals from each receiver are added in the controller, and the appropriate cumulative threshold or thresholds are used for comparison. The cumulative threshold or thresholds may be pre-established, or may be derived from constituent threshold values, depending upon which receivers are active for the respective measurement. Alternatively, the plural receiver output values may be averaged prior to comparison against a threshold or thresholds, which themselves may be pre-stored in memory or which may be derived from other stored threshold values.

As noted, the controller of FIGS. 2A and 2B is in electrical communication with each of the plural emitters and with the receiver. In those embodiments which employ plural receivers having overlapping fields of view, either in conjunction with one or more emitters, the controller is also in communication with each receiver. By knowing the relative coverage afforded by each emitter and receiver, the controller is effectively capable of monitoring only that portion of the aperture in which obstacle detection is likely and/or significant.

With respect to FIGS. 4A and 4B, the dashed line labeled PZ-PZ may represent the lower extent of a "pinch zone" through which the window travels immediately prior to closing completely. This region may also correspond closely with the degree to which a window is automatically opened if the vehicle is equipped with an automatic venting mode which is active when the vehicle ignition is off. The pinch zone may represent a principal area of interest in a monitoring system which enables selective monitoring of the airspace adjacent an aperture. More than one region of interest may be defined, depending upon the vehicle ignition status and the window system mode.

It may be preferable to use the obstacle detection system to detect solely within the pinch zone for several reasons. First, as noted above, applications for the presently disclosed aperture monitoring system which are employed when the vehicle ignition is off drain the vehicle battery. Thus, it is wasteful for a conventional monitoring system to monitor the entire aperture area, each time the detection system is active, even though only the pinch zone is of interest.

This deficiency in the prior art is addressed in the presently disclosed system by activating only the emitter or emitters which "illuminate" the pinch zone, or by activating the receiver or receivers which have the pinch zone in their field of view. This selective monitoring of the aperture may be relied upon solely in one mode, or may be interleaved with full aperture scans. Thus, in an intrusion detection mode while the vehicle is off and the respective window is partly lowered for venting purposes, the aperture monitoring system may execute a predetermined number of pinch zone-only scans, followed by one full window scan. The full window scan may be relied upon for an indication of whether the window has been broken since the presence of the window itself may have a characteristic impact on the detected radiation. Further, an arm or other object inserted through a broken window may be detected by this system when a full aperture scan is performed.

This cycle may be repeated until an object is detected or until the current mode is exited. Alternatively, in an embodiment which provides plural thresholds and is capable of returning "indeterminate" scan results, the cycle of a given number of pinch zone-only scans followed by a full scan may be altered. For instance, if an indeterminate response is derived from the output signal from the receiver(s) during a full scan, the number of pinch zone only scans may be reduced. If no object is then confirmed, the previous cycle may be resumed.

Alternatively, if an indeterminate result is obtained during a scan limited to the pinch zone, the full aperture scan may be forestalled until either an object is declared as detected, or until the indeterminate condition ceases.

One controller may be provided in association with each aperture monitoring module, such as shown in FIGS. 2A, 2B, 3A, 3B, and 5. While not illustrated, a similar monitoring system may be adapted for use in conjunction with a vehicle sunroof, or by extension, in conjunction with any volume of airspace for which object detection is desired.

As an alternative to the dedication of a controller to each monitoring system module, one central controller can be multiplexed across some or all of the constituent modules of a system. In a specific embodiment of such an alternative system, each module communicates with the central controller, such as in a multiplexed, time-interleaved fashion. In another embodiment of this alternative system, each module is provided with a memory unit instead of a respective controller. Further, one region of the volume to be monitored, which would not reflect the presence of an intervening obstacle, may be monitored as a reference region. Returns from within this region may be characterized in the memory module and used as a reference for detected returns from other regions of the volume being monitored.

Whether the monitoring system monitors the entire target volume adjacent the aperture or just a subset thereof may depend upon a variety of inputs to the controller. For instance, in the previous examples, the controller received an indication that the vehicle ignition was off and the respective window was in automatic vent mode, such that pinch zone-only scans were initiated as representing the region of the most interest. With respect to FIG. 6, one embodiment of an aperture monitoring system 100 includes a centralized controller 108 adapted for interfacing to at least one aperture monitoring module 102, such as shown in FIGS. 2A, 2B, 3A, 3B, and 5.

The controller 108 is responsible for issuing commands 104 which activate selected ones of the emitters associated with the module(s) 102 and selected ones of the receivers associated with module(s) 102, depending upon the embodiment. In response, the controller 108 receives output signals 106 from the one or more receivers in the module 102.

As previously described, the selection of which portion of the total airspace capable of being monitored, through selective activation of emitters and/or receivers, is affected by a variety of inputs to the controller 108. If the controller 108 is centralized and multiplexed between plural modules 102, the controller may be interfaced to plural power window control switches 124 and a power sunroof control switch 128. Sensors 130 may report whether a respective door is open or closed. Similarly, the status of the ignition switch 132 provides an indication of the vehicle ignition status as well as a general indication of whether the vehicle is likely to be occupied.

A rain sensor 134 accessible to the exterior of the vehicle is capable of detecting- the presence of rain, while a temperature sensor 136 is capable of detecting the temperature within and/or outside the vehicle. A light sensor 138, a motion sensor 140, and a dangerous gas sensor 142 may also provide inputs to a controller used for selective control over the presently disclosed monitoring system 100.

Thus, if the rain sensor 134 provides an input reflective of the presence of rain, the controller 108 may initiate automatic window closure through the window switches 124. As a window progresses into the pinch zone, the controller 108 is capable of limiting the aperture area to be monitored to the pinch zone alone, thus reducing the system power drawn, reducing the likelihood that extraneous signals are returned, and thus increasing the likelihood of accurate object detection. Similar response can occur due to window closure in response to various other sensors.

Window position information needed for the purpose of selectively controlling the aperture monitoring system 100 may be provided by sensors disposed in conjunction with the aperture to be monitored. Optical and/or mechanical sensors may be employed for this purpose. Alternatively, relative or absolute window position data may be derived from circuitry disposed in conjunction with a motor driving the window.

In another embodiment, the aperture monitoring system 100 itself may be employed for detecting window position within the aperture based upon pre-established characteristic returns from the window at various positions within the aperture. Selective monitoring of the aperture may enhance the ability to accurately establish window position within the aperture. For instance, in an automatic venting mode, selective monitoring of the pinch zone may be used to establish when the window has been lowered below the pinch zone. This would be evident as a result of a change in the reflected radiation in the pinch zone. The number of emitters used to collectively monitor the target airspace will determine the degree of resolution with which window position may be established, though for purposes of driving a window down just enough for venting, high resolution is not necessary.

The light sensor 138 may be intended for use in detecting sunlight, and. may be disposed within the same module as the selective detection system. The detection system may use the output of the sunlight sensor as a compensation factor in the object detection process. In addition, the light sensor 138 may be realized as part of an emitter brightness monitoring circuit, though this feature would require additional optical elements in order to couple the output of one or more emitters into the light sensor 138 for analysis of emitter output brightness. This analysis may be utilized as a further compensation factor.

The presently disclosed system providing selective monitoring of an airspace adjacent an aperture may operate in conjunction with a window control system which includes an anti-air bind feature. Such a feature partially opens the vehicle windows automatically immediately prior to door closure to prevent the temporary build-up of internal air pressure and the resultant resistance to complete door closure. Once the door is closed, this feature may return the partially lowered window(s) to the fully closed position. The presently disclosed monitoring system may be used to provide a pinch zone-only scan prior to closing the windows.

Figure 6:
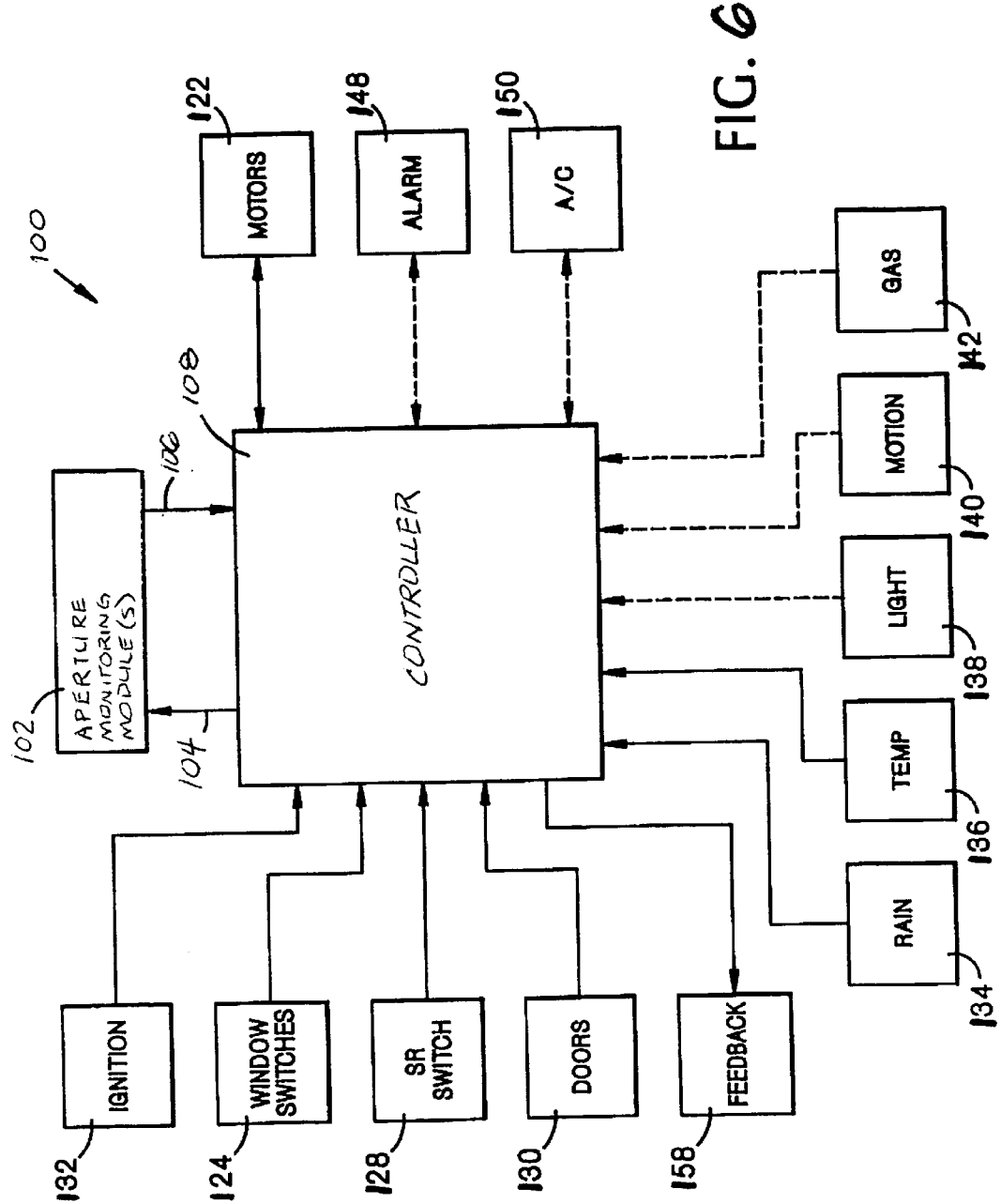
FIG. 6 illustrates some of the elements which may provide input to a controller associated with the embodiments of FIGS. 2A, 2B, 4, and 5.
Figure 7A:
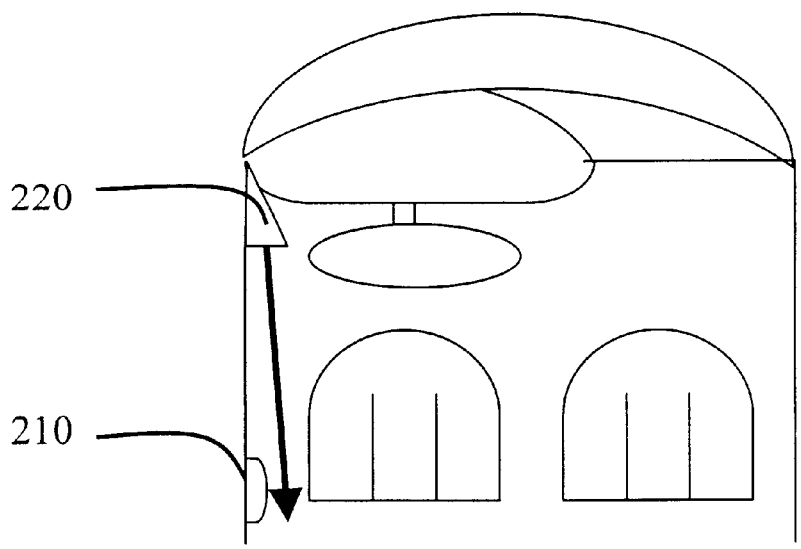
FIG. 7A illustrate a top view of a vehicle interior including one embodiment of the multifaceted sensor system according to the presently disclosed invention.
Figure 7B:
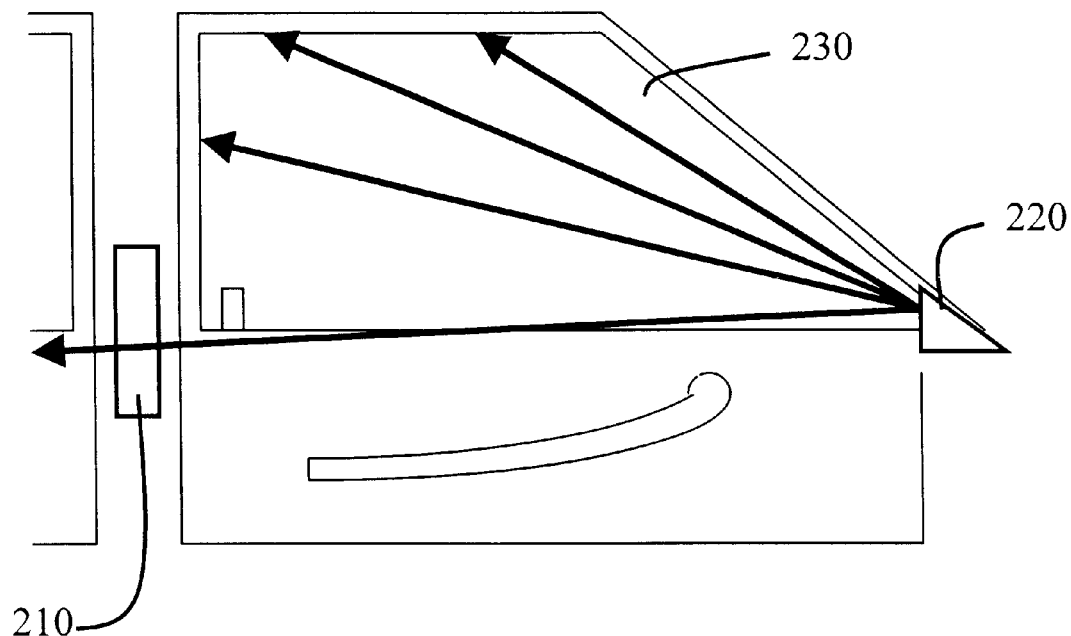
FIG. 7B illustrates a side view of a vehicle interior including the embodiment of the multifaceted sensor system of FIG. 7A.
Figure 8:
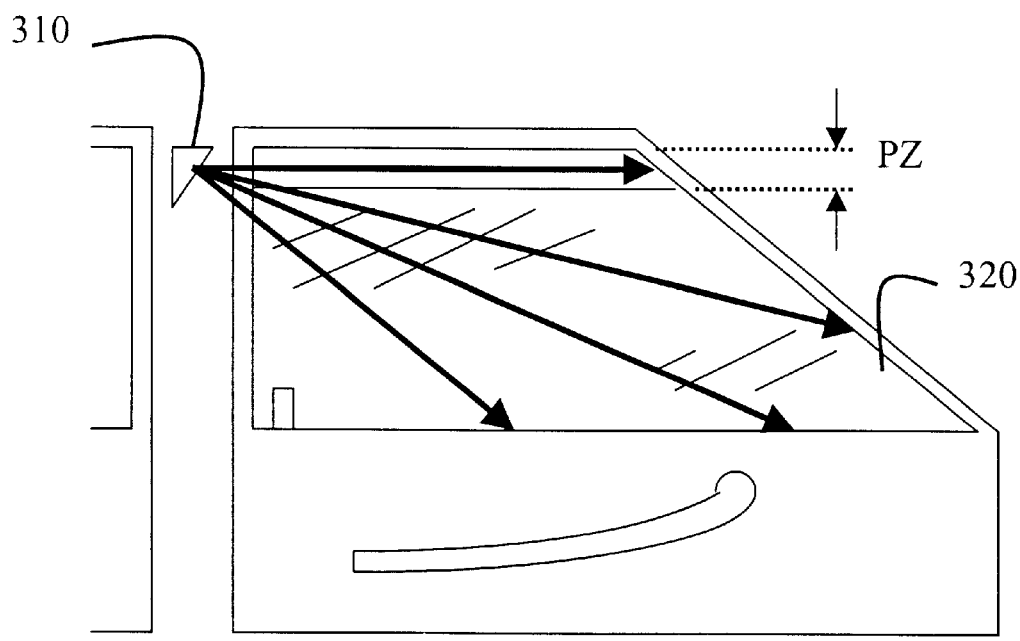
FIG. 8 illustrates a side view of a vehicle interior including another embodiment of the multifaceted sensor system according to the presently disclosed invention.

The illustrated system 100 may also provide inputs from an alarm system 148 or temperature control system 150 (labeled "A/C" in FIG. 6). Thus, when the vehicle air conditioning is activated, the controller may cause the window motors 122 to lower the windows until the air conditioner has begun outputting cold air, at which point the motors 122 are commanded to close the windows. The present system may be activated to monitor the pinch zone or some other region of significance prior to closing the windows to detect objects in the window path.

As previously described, the present monitoring system 100 may also be used in conjunction with an alarm system, such that object detection may be employed to disable the vehicle ignition, to activate an annunciator such as a horn or the vehicle lights, or to close the windows if not already in the closed position.

The selective monitoring system of the invention has been described as employing IR LEDs and IR receivers. In an alternative embodiment, ultrasound emitters and receivers may be employed. However, in this embodiment, particular care must be taken when more than one emitter is activated having a emission field which overlaps that of another emitter. Activating both overlapping ultrasound emitters at the same time may result in dead spots where the emitted energy fields effectively cancel each other. Thus, the controller in this scenario must also temporally interleave operation of the selected emitters to avoid this result. Simultaneous operation of adjacent receivers does not pose the same problem.

Various alternatives to the presently disclosed invention may be employed. For instance, the presently disclosed invention can also operate at frequencies other than IR and ultrasound. For instance, an array of individually selectable laser diodes may also be employed in conjunction with one or more receivers. As noted, an alternative embodiment can utilize simultaneously illuminated laser emitters and individually selectable receivers, each having a limited and pre-established field of view. A drawback with laser diode emitters involves the very narrow beams which they produce, on the order of less than one degree. Many such diodes would be required for most applications, leading to physical complexity. Certain applications may benefit from such narrow beams, however. Spreading the beams with lenses would be difficult due to the spatial coherence. As an alternative, a single laser diode could be employed in conjunction with a rotating mirror, the laser emissions being timed to the mirror rotation to result in the desired selective illumination.

A further feature of the present invention includes the ability to selectively control the output intensity of one or more emitters. For instance, it may be desirable to increase the sensitivity of the system over a selected region of a volume which may be monitored. The output intensity of the emitter or emitters which illuminate this selected region could then be increased. Note that other emitters may be simultaneously illuminated, but at a lower, normal intensity. In this embodiment, it may be preferred to enable increased sensitivity monitoring only when the closure within the aperture is not moving unless the detector circuitry is particularly adapted to compensate for the possibility of returns from the closure itself which would be amplified due to the increased emitter illumination.

This embodiment may be particularly useful when the vehicle is off, the windows are partly lowered for ventilation, and the vehicle alarm is active. To conserve power, only that portion of the open window is monitored by the emitter(s) and receiver(s) which have that portion in the respective field of view. Further, various iterations of lower power scans may be interleaved with higher powered scans. Where total power consumed is less of a concern, higher powered scans may be relied upon predominantly or totally in order to increase the likelihood of detecting objects having a small cross-section. Alternatively, a battery status circuit associated with a power source may communicate with the control circuit for the aperture monitoring system. High powered scans may be employed until the battery status circuit reports a certain level of charge remains, at which point interleaved high and low power scans may be employed, or all low power scans may be employed. The present invention also provides the ability to monitor a selected region at a lower, normal power level until an indeterminate return is detected, at which point higher powered scans may be activated.

In order to improve the performance of the presently disclosed aperture monitoring system when higher powered scanning is selectively employed, it may be desirable to compare the receiver response of a region which is monitored for intrusion against another monitored region which will not result in a changed or altered return if an intrusion occurs in the aperture region of interest. This ratiometric comparison may be employed continuously, or only in conjunction with activation of a high powered scan across the aperture region of interest.

Further, the presently disclosed system has been illustrated in the context of a vehicle front window. Such a system could clearly be located adjacent any vehicle window, vent, or sunroof having a powered closure operative therein. Still further, the presently disclosed system can be implemented to selectively monitor an aperture whether or not a powered closure is disposed for operation therein. For instance, the present system may be utilized to monitor selected portions of an aperture to detect intruders or the passing of foreign objects which might result in damage to machinery in an industrial setting. Such a system could also be adapted to monitor an aperture for a vehicle or non-vehicular sliding door, or powered hatch or lift gate.

Yet another embodiment of the present invention employs more than one aperture monitoring system 100. In this embodiment, each aperture monitoring system may operate independently or may be controlled cooperatively to optimize coverage of the respective aperture.

The presently disclosed system may also be employed in conjunction with various other sensors, including a contact-based obstacle detection system. In this case (not illustrated), the controller 108 is responsive to the output of a contact-based detection system and may rely upon the presently disclosed system enabling selective monitoring of an aperture for a further indication of whether an obstacle exists in the region of interest. The non-contact selective monitoring system may always be employed in conjunction with the contact-based system, or may be selectively utilized only in those cases where the output of the contact-based system alone is indeterminate. Conversely, the contact-based system may be utilized as a back-up for the non-contact selective monitoring system only when the non-contact system provides results which are indeterminate.

What is claimed is:

1. A module for selectively monitoring a volume associated with a vehicle having an aperture, a power window system operative in conjunction with said aperture, and a side-impact airbag system, said module comprising:

plural emitters comprising first emitters for collectively generating a first energy field proximate said aperture and a second emitter for generating a second energy field proximate a side-impact airbag disposed adjacent said aperture;

a receiver for receiving a reflected portion of said first and second energy fields and for generating an output indicative of said received energy; and a controller, in communication with each of said plural emitters and said receiver, for selectively enabling said plural emitters to selectively emit energy proximate said aperture and proximate said side-impact airbag, for receiving said output from said receiver, and for generating first and second control signals in response to said output from said receiver, wherein said first control signal is characteristic of said reflected portion of said first energy field received by said receiver and is for use as an input to said power window system, wherein said second control signal is characteristic of said reflected portion of said second energy field received by said receiver and is for use as an input to said side-impact airbag system, and wherein said controller is responsive to said power window system in determining the portion of said volume proximate to said aperture to be monitored and in selectively enabling a portion of said plural first emitters to emit said first energy field proximate to said aperture to monitor said portion of said volume proximate to said aperture.

2. The system of claim 1, wherein said first energy field generated by said first emitters is substantially planar.

3. The system of claim 1, wherein each of said plural first emitters is angularly offset, with respect to a horizontal plane, from each other of said plural first emitters.

4. The system of claim 1, wherein said controller is operative to temporally interleave emissions from said first emitters with emissions from said second emitter.

5. The system of claim 1, wherein said controller is further for identifying the position of a window within said aperture from said receiver output.

6. The system of claim 1, wherein said controller is further for identifying if a vehicle occupant is adjacent said airbag from said receiver output.

* * * * *